(12) United States Patent
Rout

(10) Patent No.: US 9,932,526 B2
(45) Date of Patent: Apr. 3, 2018

(54) METHOD OF TREATING CRUDE OIL WITH ULTRASOUND VIBRATIONS AND MICROWAVE ENERGY

(71) Applicant: 1555771 ALBERTA LTD., Calgary (CA)

(72) Inventor: Bruce Rout, Calgary (CA)

(*) Notice: Subject to any disclaimer, the term of this patent is extended or adjusted under 35 U.S.C. 154(b) by 890 days.

(21) Appl. No.: 14/454,205

(22) Filed: Aug. 7, 2014

(65) Prior Publication Data

US 2015/0041369 A1 Feb. 12, 2015

Related U.S. Application Data

(60) Provisional application No. 61/863,726, filed on Aug. 8, 2013.

(51) Int. Cl.
| | | |
|---|---|---|
| C10G 1/00 | (2006.01) | |
| C10G 15/08 | (2006.01) | |
| E21B 43/00 | (2006.01) | |
| C10G 32/02 | (2006.01) | |
| C10G 55/02 | (2006.01) | |

(52) U.S. Cl.
CPC .............. *C10G 15/08* (2013.01); *C10G 1/002* (2013.01); *C10G 32/02* (2013.01); *C10G 55/02* (2013.01); *E21B 43/003* (2013.01); *C10G 2300/4037* (2013.01); *C10G 2300/44* (2013.01)

(58) Field of Classification Search
CPC .............................. C10G 15/08; C10G 1/002; C10G 2300/4037; C10G 2300/44; C10G 32/02; C10G 55/02; E21B 43/003; E21B 43/16
See application file for complete search history.

(56) References Cited

U.S. PATENT DOCUMENTS

| | | | | |
|---|---|---|---|---|
| 4,026,358 A | * | 5/1977 | Allen | ...................... E21B 43/16 166/261 |
| 7,486,248 B2 | * | 2/2009 | Halek | ...................... H01Q 1/04 210/748.07 |
| 2004/0031731 A1 | | 2/2004 | Honeycutt et al. | |
| 2006/0180500 A1 | * | 8/2006 | Gunnerman | ........... C10G 32/00 208/15 |
| 2009/0260818 A1 | | 10/2009 | Daniel et al. | |

FOREIGN PATENT DOCUMENTS

WO    WO2012055009    5/2012

OTHER PUBLICATIONS

Hamidi, H., et. al., A role of ultrasonic frequency and power on oil mobilization in underground petroleum reservoirs, 2012, J. Petrol. Explor. Prod. Technol. 2:29-36.*

* cited by examiner

*Primary Examiner* — Renee Robinson
*Assistant Examiner* — Derek N Mueller
(74) *Attorney, Agent, or Firm* — Eduardo Krupnik

(57) ABSTRACT

The present invention relates to methods of treating heavy crude oil on the surface or in situ. The methods of the present invention include: (a) mixing the heavy crude oil with a solvent; (b) subjecting the mixture to ultrasonic vibrations; and (c) subjecting mixture treated with ultrasonic vibrations to microwave energy.

9 Claims, 1 Drawing Sheet

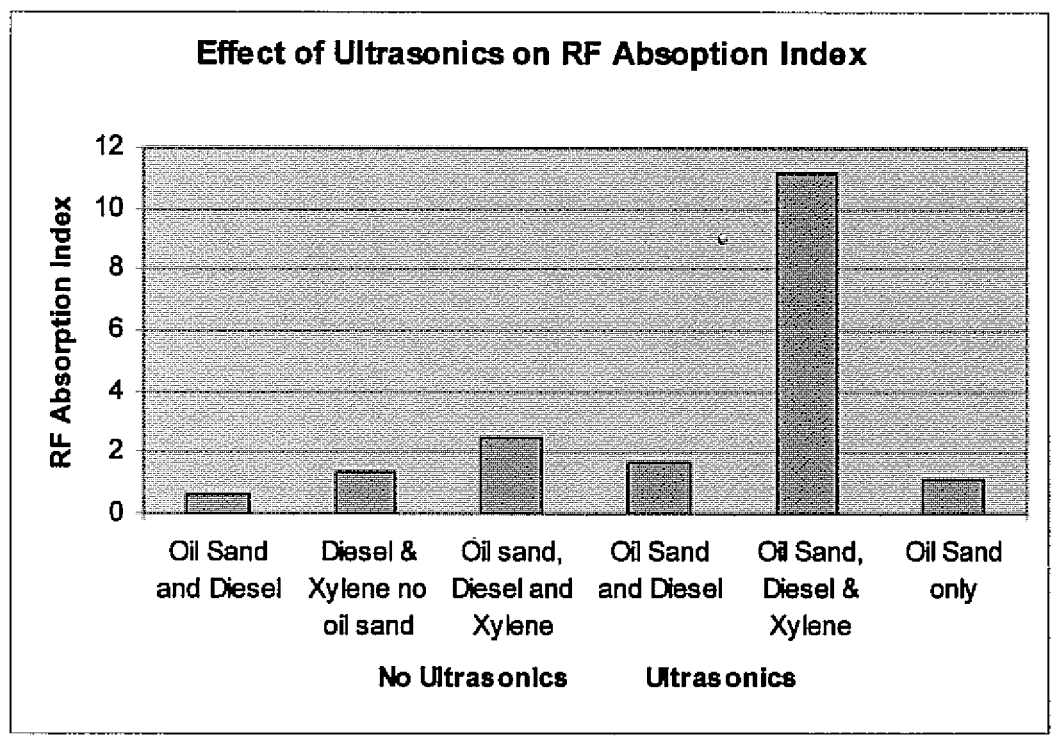

_US 9,932,526 B2_

METHOD OF TREATING CRUDE OIL WITH ULTRASOUND VIBRATIONS AND MICROWAVE ENERGY

CROSS REFERENCE TO RELATED APPLICATIONS

This application claims the benefit of provisional patent application Ser. No. 61/863,726, filed Aug. 8, 2013, the contents of which are hereby incorporated by reference into the present disclosure.

FIELD OF THE INVENTION

The present invention relates in general to methods of treating crude oils, in situ or on the surface, using ultrasound vibrations and microwave energy.

BACKGROUND OF THE INVENTION

Oil sands, which may also be referred to as tar sands, are a type of unconventional petroleum deposit. The oil sands consist essentially of a matrix of bitumen, sand, water and clay which has a very high viscosity and is therefore practically immobile. The bitumen may be some times defined as a form of extra heavy oil and is extremely difficult to extract.

Methods used to separate the bitumen from the sand require significant energy, chemicals and/or water. In certain circumstances, the sands can be extracted by strip mining, or the bitumen can be made to flow into wells by in situ techniques, which reduce the viscosity by injecting steam, solvents, and/or hot air into the sands.

Presently, SAGD, (steam assisted gravity drainage), is most commonly used to extract the bitumen from the deposits below 400 m depth (http://www.globaloilsands.com/Mining/index.shtml). The SAGD process requires vast amounts of water and natural gas and has, therefore, a large environmental impact.

Once separated from the sand, lighter oils and hydrocarbons can be obtained from crude oil and heavier hydrocarbons through cracking processes involving distillation of crude oils in processing plants. Cracking, or refining, is the overall reduction of lengths of hydrocarbon chains, usually in alkanes.

Shale oil is sedimentary rock with a relatively high organic content having approximately 30-60 wt % volatile matter and fixed carbon. When shale oil is heated in the absence of air, approximately 20-50 gallons of viscous heavy oil is derived per ton of typical shale. The organic matter, namely kerogen, is believed to exist between particles of inorganic minerals and some portion may be chemically bound with these minerals. It is believed that the typical composition of kerogen is 66-80 wt % carbon, 7.1-12.8 wt % hydrogen, 0.1-8.8 wt % sulphur, 0.1-3 wt % nitrogen and 0.75-27.4 wt % oxygen.

Ultrasonics has been attempted for in situ oil sand extraction processes previously. PCT/CA2011/001120 relates to a method for separating, extracting and refining hydrocarbons from a hydrocarbon matrix, such as oil sand or oil shale without addition of a polar liquid such as water.

A process for extracting oils which does not use pressure and which is much less expensive is needed. Microwave experiments, attempting to heat formations and thereby lower viscosity of deposits, have been tried and results show little or no promise of success. Even though there are major challenges to getting a microwave tool to work downhole, the formation does not heat since bitumen is not an absorber of microwave, or electromagnetic, radiation. Microwave technology attempts to heat water deposits which may lie in formations with deposits of bitumen. Although the water deposits absorb microwave energy and some heating occurs, the vast heat sink of the formation prevents any appreciable rise in temperature which would be required to appreciably lower viscosity in surrounding oil deposits.

U.S. Pat. Appl. Publ. No. US 20040031731 ("US '731") discloses a process for the microwave treatment of oil sands and shale oils. Organic chemicals do not significantly absorb microwave energy. The process of US '731 consists of admixing the oil sand or shale with a sensitizer and subjecting the mixture oil sand and sensitizer or shale and sensitizer to microwave energy. The sensitizer serve to facilitate the transfer of electromagnetic energy to the non-absorbing organic molecules. There are important disadvantages of the process disclosed in US '731. First, the process uses a sensitizer that strongly absorbs microwave energy. Sensitizers are particles or solids (eg. activated carbon and metal oxides such as NiO, CuO, $Fe_3O_4$, $MnO_2$, $Co_2O_3$ and $WO_3$) and they need to be mechanically mixed with the oil sand or shale. Second, the process takes place outside of the oil deposit (i.e. on the surface) and not in situ, and it requires heavy equipment such as hoppers and conveyer belts. Third, the oil sand or shale need to be pre-heated prior to mixing with the sensitizers.

Further and other objects of the invention will be realized from the following Summary of the Invention, the Description of the Invention and the embodiments and examples thereof.

SUMMARY OF THE INVENTION

The present invention provides for a use of microwave following the absorption of solvents into heavy crude oil. By contrast to the prior art, the present invention is based upon the concept of microwave cracking of oil previously treated with ultrasound vibrations. The methods of the present invention do not require the use of polar substances or sensitizers.

As such, in one embodiment, the present invention provides for a method of treating heavy crude oil, the method including: (a) mixing the heavy crude oil with a solvent; (b) subjecting the mixture to ultrasonic vibrations; and (c) subjecting mixture treated with ultrasonic vibrations to microwave energy.

In another embodiment, the present invention provides for an in situ method for the treatment of a heavy crude oil deposit. In one embodiment, the method includes: (a) disposing a solvent in the heavy crude oil deposit, such that a mixture is created between the solvent and the heavy crude oil in the deposit; (b) subjecting the mixture in the heavy crude oil deposit to ultrasonic vibrations; and (c) subjecting the oil deposit to microwave energy.

In one embodiment of the above two methods, the method further includes extracting the heavy crude oil.

In one embodiment of the above two methods, the solvent is a non-polar solvent. In one aspect of the present invention, the non-polar solvent is selected from the group of solvents comprising of: alkanes, alcohols, aromatic hydrocarbons, frac fluids, liquid fuels, reformates and any combination thereof.

In another embodiment of the above two methods, the solvent is provided as a mixture between the solvent and a suitable dilutant. In one aspect of the present invention, the dilutant is a diesel.

In another embodiment of the above two methods, the aromatic hydrocarbon is benzene, a benzene derivative or a combination thereof.

In another embodiment, the methods of the present invention are free of using polar substances. In one aspect of the present invention, the methods of the present invention are free of using water.

In another embodiment, the methods of the present invention are free of using sensitizers, for example free of using solids that facilitate the transfer of microwave electromagnetic energy to non-absorbing organic molecules.

BRIEF DESCRIPTION OF THE DRAWINGS

The following FIGURE illustrate various aspects and preferred and alternative embodiments of the invention.

FIG. 1. Graph illustrating the effect of ultrasonics on radiofrequency (RF) absorption index.

DESCRIPTION OF THE INVENTION

Definitions

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise. In order to aid in the understanding and preparation of the within invention, the following illustrative, non-limiting, examples are provided.

By "in situ" it is meant that the process takes place at the crude oil deposit or oil reservoir, and without extracting the crude oil from the crude oil deposit.

The term "hydrocarbon matrix" as used in this document refers to a raw or crude mixture which includes crude oil and a substrate. The crude oil may include heavy crude oil. The substrate may be a mixture of sand, sandstone, sedimentary rocks, clays, carbonate and so forth. Hydrocarbon matrices include, for example, oil sand or oil shale in an oil deposit, and oil sand or oil shale taken or mined from an oil deposit.

The term "media" as used in this document refers to substances capable of transferring ultrasonic energy from an ultrasonic transducer.

The term "oil deposit" refers to an area with reserves of recoverable crude oil or petroleum. Oil deposits include conventional oil deposits, shale oil deposits, oil sand deposits and carbonate oil reservoirs.

The term "recovery" as used in this documents means techniques for extracting crude oil from an oil deposit or reservoir.

Overview

The present invention relates to a process of treating heavy crude oils on the surface or in deposits with ultrasonic vibrations and microwaves.

The microwave processes of the prior art use water. The polarized medium (i.e. water) is used so that the medium in the oil deposit will absorb the microwaves. The use of a polarized medium in a non-polarized environment (the oil deposit) is quite inefficient. Accordingly, a method that is free of polarized media has been developed herein.

In one embodiment, the method of treating heavy crude oil may include: (a) mixing the heavy crude oil with a solvent and an aromatic hydrocarbon; (b) subjecting the mixture to ultrasonic vibrations; and (c) subjecting mixture treated with ultrasonic vibrations to microwave energy.

Oil deposits do not heat with microwave because bitumen is not an absorber of microwave, or electromagnetic, radiation. The inventor, unexpectedly, discovered that ultrasonic vibrations may change the nature of a mixture of oil and a solvent to facilitate the absorbance of microwaves. As a result, polarized media, such as water, or sensitizers may not be needed. The combination of ultrasonics and microwaves without the addition of a polar substance may reduce the viscosity of the crude oil by reducing the length of the hydrocarbons in the crude oil matrix. Lower viscosity may allow for pumpable oil, easier extraction of the oil from the deposit, and facilitate transportation to an upgrading processing centre without use of steam, heat and other high cost processes.

The methods of the present invention may be carried out in situ or on the surface.

The solvent may be any suitable solvent, preferably a solvent that dissolves poorly in water. The solvent may be selected from the group of solvents comprising: non-cyclic hydrocarbons, aromatic hydrocarbons, alcohols, reformates, frac fluid, and any combination thereof. The solvent may be provided as a mixture of solvent and one or more suitable dilutants. Suitable dilutants or carriers may include diesels or other liquid fuels. The solvent/dilutant ratio may be from 1-99% v/v solvent and 1-99% v/v dilutant.

The aromatic hydrocarbon may be benzene, chemical compounds derived from benzene, chemical compounds having a benzene ring or any combination thereof. In one embodiment, the aromatic hydrocarbon may be xylene, toluene, or a combination thereof. Isomers of aromatic hydrocarbons are also included.

In another embodiment of the present invention, the method may be free or devoid of using polar substances. In one aspect of the present invention, the method may be free of using water. In yet another embodiment, the method of the present invention may be free or devoid of sensitizers, such as those described in US Pat. Publ. No. 2004/0031731.

In Situ

In one embodiment, the present invention provides for an in situ method of treating heavy crude oil deposits. The method, in one embodiment, may include: (a) disposing a solvent and an aromatic hydrocarbon into the heavy crude oil deposit, such that a mixture is created between the solvent, the aromatic hydrocarbon, and the heavy crude oil in the deposit; (b) subjecting the mixture in the heavy crude oil deposit to ultrasonic vibrations; and (c) subjecting the oil deposit to microwave energy. In one embodiment, the method further includes (d) extracting the heavy crude oil from the deposit.

In one embodiment the present invention describes in situ and on surface methods of extracting hydrocarbons from a heavy oil formation, such as an oil sand deposit or oil shale deposit. The in situ method of extracting hydrocarbons from an oil deposit may start by disposing (including pouring or injection) a solvent into the deposit. A bore or well may be made in the oil deposit, and the solvent may be disposed (including injecting or pouring) into the bore. The solvent may be any suitable solvent, preferably one that dissolves poorly in water. Examples of solvents may include non-cyclic hydrocarbon such as pentanes, hexanes, heptanes or octanes, aromatic hydrocarbons, and alcohols. Diesels, gasoline frac fluid, reformate compositions or any combination thereof may also be used. The solvent may be provided as a mixture of solvent and one or more suitable dilutants. Suitable dilutants or carriers may include diesels or other liquid fuels. The solvent/dilutant ratio may be from 1-99% v/v solvent and 1-99% v/v/dilutant.

The in situ method may also include disposing (injecting or pouring) an aromatic hydrocarbon into the oil deposit. The aromatic hydrocarbon may be disposed before, together with, or after disposing the solvent. The aromatic hydrocarbon may be benzene, chemical compounds derived from benzene, chemical compounds having a benzene ring or any combination thereof.

The in situ method may continue by subjecting the deposit to ultrasonic vibrations. The ultrasonic vibrations may start before, during or after disposing the solvent and aromatic hydrocarbon.

An ultrasonic transducer may be brought into the well and may contact with the non-polar substance which has been poured into the well. From about 1 kHz to about 80 kHz of ultrasonic vibration may be used. However, a person of ordinary skill in the art may understand that less than 1 kHz or more than 80 kHz may be used. When the ultrasonic transducer is turned on, the vibrations in the non-polar solvent may turn the liquid into an ultrasonic media which may dissolve the heavy crude oil in the oil deposit. The dissolved heavy crude oil may in turn create even more ultrasonic media from the solvent/crude oil mixture which continues to spread further into the matrix of the oil deposit. Furthermore, heat may be generated from this method as a result of exothermic reactions within the dissolving process.

The in situ method may continue by subjecting the deposit to microwave energy. The microwave energy may be applied during treatment with the ultrasound transducer or after treatment with the ultrasound transducer. A microwave tool may be brought into the well and may contact with the mixture in the deposit. Microwave irradiation may be provided by a tool such as that described in US Pat. Application Publ. No. 2009/0260818, the contents of which are incorporated herein by reference. The microwave tool of this patent application includes a microwave source that can be switched on or off, and which is connected, by means of a cable, to one or more transmitting antennae mounted on pads at the ends of arms which can be used to position the antennae close to the borehole wall. The tool is placed downhole by means of a wireline cable (other conveyance means such as drill pipe or coiled tubing can also be used), and is activated downhole when near a region of interest.

The solvents, ultrasonic vibrations and microwave energy may contribute in reducing the viscosity of the heavy crude oil which may flow be pumped out of the well, thereby extracting the hydrocarbons (such as bitumen present in oil sands) in situ from the oil deposit.

In order to aid in the understanding and preparation of the within invention, the following illustrative, non-limiting, examples are provided.

EXAMPLE 1

In order to demonstrate the methods of the present invention, the following experiments were carried out.

1. Substances

Samples of oil sand were obtained from The Alberta Research Council. Diesel was obtained from a local retail gas station; xylene was obtained from a local paint store.

2. Tools 1.3 KWatt microwave oven manufactured by the Toshiba Corporation of Tokyo™, Japan in 1987. The oven's rated maximum output is 720 Watt. The oven is model # ERX-1790C-1.

The temperatures were measured using a Reed™ R2001 infrared thermometer rated to read temperatures from −50 to 280 degrees C.

A Whaledent Biosonic UC1-110 operating at 55 KHz, was used to test the effects of ultrasonics on oil sand.

A ceramic bowl having a mass of 61.g.

A 100 ml beaker. Mass of beaker: 50.2 g

3. Experiments

A standardized index of measure was used to determine the absorption effect of microwaves. The 100 ml beaker containing 80 ml of room temperature water was placed in the centre of the microwave oven. Substances were placed in a small ceramic bowl and the bowl placed about 1 cm from the beaker of water inside the microwave oven. The oven door was closed and the oven was turned on at maximum level for 30 seconds. The temperature of both substances and water was taken before and after being exposed to microwaves by the oven. The mass of each substance was taken prior to microwaving.

The temperatures were measured using the infrared thermometer. There is a spot size of 8:1 for the read area of the beam of the thermometer. The infrared thermometer was placed about 8 cm from items measured resulting in a spot size of measurement of 1 cm diameter, which ensured a reasonably accurate measure of temperature. Items were placed on a nearby wooden table while temperature was being measured.

The addition to a beaker of water in the microwave oven is used as a control fro comparison and ensures a standard accurate measure of microwave absorption. Furthermore, since a standard amount of microwave energy is emitted into the oven, the comparison of the heating of the beaker of water and heating of the substance leads to the ability to calculate an index which indicates the comparative ability of substances to be heated by microwaves.

In each measure, both the bowl and beaker were thoroughly washed and dried and brought to ambient room temperature. The empty bowl and beaker of water achieved almost the same amount of heating when heated together. Both rose from 21.5 degrees to 41.5 degrees in 30 seconds.

In turn, various substances were placed in the bowl and the experiment repeated. Some substances were ultrasonically treated for 15 minutes and some were not.

Two main experiments were carried out: one without the use of ultrasound vibrations (results shown in Table 1 and FIG. 1) and the other with ultrasound (results shown in Table 2 and FIG. 1). Within each experiment, three sub-experiments were carried out using the following substances or mixtures of substances: For Experiment 1 (without ultrasound): (a) oil sand (OS) and diesel, (b) diesel and xylene, and (c) oil sand, diesel and xylene; for Experiment 2 (with ultrasound): (a) oil sand and diesel, (b) oil sand, diesel and xylene, and (c) oil sand only.

4. Results

FIG. 1, table 1 (Experiment without ultrasonic treatment) and table 2 (experiment with ultrasonic treatment) illustrate the results of the present experiments. The index is calculated by taking the inverse.

5. Discussion

Radio waves in the form of microwaves have been tried in downhole and oil bearing formations with little success. Although there are reports of heating of pockets of water in subsurface formations, this heating is minor and to date, using microwaves to heat oil bearing formations has not proved to be economically successful.

The experiments described herein were conducted to investigate the effect of ultrasonic treatment on solvents and oil sand regarding the ability of these substances to absorb microwaves and thereby enabling this technology to be used in an economically viable way in treating oil products for sub-surface extraction and on surface.

It has previously been shown by the Inventor that solvents would be absorbed efficiently into a formation and into oil bearing substances. It appears there is some alteration of the molecular structure of the resultant ultrasonically treated mixture or solution. This has been shown to be true using chemical analysis of carbon chain abundance before and after ultrasonic treatment.

Microwaves may be easily absorbed by polar chemical substances such as water and not by non-polar substances. The inventor now tested whether ultrasonics can alter the structure of non-polar solvents and petroleum such that a small degree of polarization forms within molecular structure of the solution/mixture.

The inventor has found that a solution/mixture of diesel and bitumen, placed in a microwave oven, heats quickly to dangerous levels. The inventor has also found that ultrasound, with diesel in downhole formations, is absorbed into a solution/mixture.

The results illustrated in FIG. 1 unexpectedly show that some substances, notably Xylene mixed with diesel, have significant changes in their ability to absorb microwave energy after being treated with ultrasound vibrations.

TABLE 1

Without Ultrasonic Treatment

|  | Mass (g) | T1 C | T2 C | delta T C | d T/Kg | delta T water − delta T mixture | (dT wat − dt mix)/ mass mix | index |
|---|---|---|---|---|---|---|---|---|
| Experiment #1 Oil Sand and Diesel |  |  |  |  |  |  |  |  |
| mass of OS | 7.6 |  |  |  |  |  |  |  |
| mass of Diesel | 7.9 |  |  |  |  |  |  |  |
| Mixture | 15.5 | 22.4 | 32.6 | 10.2 | 0.658065 | 24 | 1.548387 | 0.645833 |
| Water |  | 21.8 | 56 | 34.2 |  |  |  |  |
| Experiment #2 Diesel & Xylene no oil sand |  |  |  |  |  |  |  |  |
| mass of Diesel | 5.2 |  |  |  |  |  |  |  |
| mass of Xylene | 5.3 |  |  |  |  |  |  |  |
| Mixture | 10.5 | 23.5 | 38 | 14.5 | 1.380952 | 7.5 | 0.714286 | 1.4 |
| Water |  | 22 | 44 | 22 |  |  |  |  |
| Experiment #3 Oil sand, Diesel and Xylene |  |  |  |  |  |  |  |  |
| mass of OS | 7.8 |  |  |  |  |  |  |  |
| mass of Diesel | 5.9 |  |  |  |  |  |  |  |
| mass of Xylene | 5.9 |  |  |  |  |  |  |  |
| Mixture | 19.6 | 24.2 | 35.2 | 11 | 0.561224 | 7.7 | 0.392857 | 2.545455 |
| Water |  | 22.3 | 41 | 18.7 |  |  |  |  |

TABLE 2

With Ultrasonic Treatment

|  | Mass (g) | T1 C | T2 C | delta T C | d T/Kg | delta T water − delta T mixture | (dT wat − dt mix)/ mass mix | inverse |
|---|---|---|---|---|---|---|---|---|
| Experiment #4 Oil Sand and Diesel |  |  |  |  |  |  |  |  |
| mass of OS | 44 |  |  |  |  |  |  |  |
| mass of Diesel | 27.7 |  |  |  |  |  |  |  |
| Mixture | 21.6 | 23.3 | 37.2 | 13.9 | 0.643519 | 12.7 | 0.587963 | 1.700787 |
| Water |  | 22.4 | 49 | 26.6 |  |  |  |  |
| Experiment #5 Oil Sand, Diesel & Xylene |  |  |  |  |  |  |  |  |
| mass of OS | 43 |  |  |  |  |  |  |  |
| mass of Diesel | 22.1 |  |  |  |  |  |  |  |
| mass of Xylene | 22.7 |  |  |  |  |  |  |  |

TABLE 2-continued

| | With Ultrasonic Treatment | | | | | | | |
|---|---|---|---|---|---|---|---|---|
| | Mass (g) | T1 C | T2 C | delta T C | d T/Kg | delta T water − delta T mixture | (dT wat − dt mix)/ mass mix | inverse |
| Mixture | 22.4 | 25.4 | 37.6 | 12.2 | 0.544643 | 2 | 0.089286 | 11.2 |
| Water | | 23.7 | 37.9 | 14.2 | | | | |
| Experiment #6 | | | | | | | | |
| Oil Sand only | | | | | | | | |
| mass of OS | 43.4 | | | | | | | |
| Mixture | 24.4 | 24.4 | 32.5 | 8.1 | 0.331967 | 22 | 0.901639 | 1.109091 |
| Water | | 23.1 | 53.2 | 30.1 | | | | |

Through the embodiments that are illustrated and described, the currently contemplated best mode of making and using the invention is described. Without further elaboration, it is believed that one of ordinary skill in the art can, based on the description presented herein, utilize the present invention to the full extent.

Although the description above contains many specificities, these should not be construed as limiting the scope of the invention, but as merely providing illustrations of some of the presently embodiments of this invention. Thus the scope of the invention should be determined by the appended claims and their legal equivalents, rather than by the examples given.

What is claimed is:

1. A method of treating bitumen, the method including: (a) mixing the bitumen with a water-free solution of a solvent and an aromatic hydrocarbon; (b) subjecting the bitumen and the water-free mixture to ultrasonic vibrations; and (c) subjecting the mixture treated with ultrasonic vibrations to microwave energy, wherein the solvent is selected from the group consisting of: alkanes, alcohols, fuel liquids, reformates, frac fluids and any combinations thereof, and the aromatic hydrocarbon is benzene, a benzene derivative or a combination thereof.

2. The method of claim 1, wherein the method is free of using polar substances.

3. The method of claim 1, wherein the method is free of using sensitizers.

4. The method of claim 1, wherein the solvent is provided as a mixture between the solvent and a suitable dilutant.

5. An in situ method for the treatment of a bitumen deposit, the method including: (a) disposing a water-free solution consisting of a solvent and an aromatic hydrocarbon into the bitumen deposit, such that a mixture is created between the solvent, the aromatic hydrocarbon and the bitumen in the deposit; (b) subjecting the mixture in the bitumen deposit to ultrasonic vibrations; and (c) subjecting the bitumen deposit to microwave energy, wherein the solvent is selected from the group consisting of: alkanes, alcohols, fuel liquids, reformates, frac fluids and any combinations thereof, and the aromatic hydrocarbon is benzene, a benzene derivative or a combination thereof.

6. The method of claim 5, wherein the method further includes extracting the bitumen from the oil deposit treated with ultrasonic vibrations and microwave energy.

7. The method of claim 5, wherein the method is free of using polar substances.

8. The method of claim 5, wherein the method is free of using sensitizers.

9. The method of claim 5, wherein the solvent is provided as a mixture between the solvent and a suitable dilutant.

* * * * *